United States Patent [19]

Hurt

[11] Patent Number: 4,595,460
[45] Date of Patent: Jun. 17, 1986

[54] METHOD AND APPARATUS FOR WATER DISTILLATION WITH ENERGY RECOVERY

[76] Inventor: Charles F. Hurt, Rte. 5, Box 200, Bedford, Va. 24523

[21] Appl. No.: 531,289

[22] Filed: Sep. 12, 1983

[51] Int. Cl.[4] .......................... B01D 3/34; C02F 1/04
[52] U.S. Cl. ........................................ 203/21; 203/11;
   203/49; 203/94; 203/100; 203/DIG. 1;
   203/DIG. 18; 203/DIG. 20; 202/185 A;
   202/185 B; 202/203; 202/234
[58] Field of Search ............... 202/205, 185.2, 185.3,
   202/181, 203, 234, 185.1; 203/11, DIG. 20,
   DIG. 1, DIG. 18, 49, 100, DIG. 8, 21, 98, 94

[56] References Cited

U.S. PATENT DOCUMENTS

| | | | |
|---|---|---|---|
| 1,966,938 | 7/1934 | Stone | 203/26 |
| 2,006,985 | 7/1935 | Claude et al. | 203/10 X |
| 2,389,064 | 11/1945 | Latham | 203/26 |
| 3,076,096 | 1/1963 | Bachmann . | |
| 3,140,986 | 7/1964 | Hubbard | 203/11 |
| 3,160,572 | 12/1964 | Rarden | 202/182 |
| 3,248,307 | 4/1966 | Walford | 203/11 |
| 3,275,532 | 9/1966 | Harper | 203/11 |
| 3,338,798 | 8/1967 | Paar | 203/11 |
| 3,468,762 | 9/1969 | Klitzsch . | |
| 3,488,261 | 1/1970 | Loebel | 203/26 |
| 3,553,084 | 1/1971 | Creskoff | 203/11 X |
| 3,558,436 | 1/1971 | Foley et al. . | |
| 3,577,320 | 5/1971 | Randell | 202/203 X |
| 3,635,799 | 1/1972 | Lowi | 202/185.3 X |
| 3,674,652 | 7/1972 | Brown | 203/11 |
| 3,930,959 | 1/1976 | Kirschmann | 202/203 X |
| 4,222,825 | 9/1980 | Eisden | 202/203 X |
| 4,235,678 | 11/1980 | McKeen | 203/11 X |
| 4,269,664 | 5/1981 | Younger . | |
| 4,302,297 | 11/1981 | Humiston | 203/11 X |
| 4,319,965 | 3/1982 | Parker | 203/11 |

Primary Examiner—Wilbur Bascomb
Attorney, Agent, or Firm—Lowe, Price, LeBlanc Becker & Shur

[57] ABSTRACT

A liquid distillation apparatus provides recirculating flow of unevaporated liquid and recovery of energy from the liquid circulation. Liquid columns in communication with each other are provided differing liquid levels to enhance circulation of the liquid, and to provide efficient operation of the apparatus. Aeration is used to raise the level of the liquid in one of the liquid columns as well as to improve vapor generation for use in a condenser. The two liquid columns are separated from one another except for a connection at the tops and bottoms thereof to permit recirculation of the liquid. The aeration system may be operated by energy recovered from the circulating liquid.

36 Claims, 2 Drawing Figures

METHOD AND APPARATUS FOR WATER DISTILLATION WITH ENERGY RECOVERY

BACKGROUND OF THE INVENTION

This invention relates to processes and structures for treatment and purification of liquids, and more specifically to such processes and systems for purifying waste water by distillation, including therein steps and apparatus for production of energy as a byproduct of the purification.

Distillation processes and systems are known in which electrical energy is generated as a byproduct of the distillation process. In U.S. Pat. No. 3,468,762 there is described an apparatus for distillation of sea water in which sea water is pumped into a three-stage filter unit through a turbine. The turbine is operatively connected to a drive shaft, so that the head pressure of the ocean water as well as the pump operation causes the turbine to rotate, and thus to rotate the drive shaft. An electric generator, in turn, is driven by the drive shaft to produce output electrical energy. The desalinization apparatus requires the use of complex structures, resulting in an expensive and complicated apparatus.

In U.S. Pat. No. 3,076,096 there is described a structure for conversion of sea water utilizing a complicated arrangement in which a pair of large tanks contain solutions having different solute concentrations and developing different vapor pressures therein. A turbine is connected to the two tanks and is driven by the vapor pressure differential therebetween, in turn driving an electric generator to deliver electrical output power.

Other distillation devices are known and illustrated by U.S. Pat. Nos. 3,558,436 and 4,269,664.

However, each of the distillation and desalinzation devices previously described is complex and, moreover, by design, not readily applicable to distillation of waste water. There is thus a need in the prior art for structures capable of purifying waste water and distilling liquids with efficiency and simplicity, and further providing energy output as a byproduct.

SUMMARY AND OBJECTS OF THE INVENTION

It is accordingly an object of the present invention to overcome the difficulties of the prior art and to provide method and apparatus for efficient treatment of liquids by distillation.

It is a more specific object of the invention to provide a liquid distillation apparatus in which the liquid is input to a first column and provided in turn to a second column having a higher liquid level than the first column, thereby to provide a closed recirculation system for the liquid.

It is still a more specific object of the invention to provide a water distillation apparatus in which waste water is input to a first column and operates a turbine therein, the turbine preferably operating an electric generator.

It is still a further object of the invention to provide for at least partial evaporation of input waste water and for recirculation of the unevaporated water together with the input water, and to provide efficient means for recirculation and evaporation of the water.

In accordance with the foregoing and other objects of the invention, there is provided a liquid distilling apparatus including components for forming first and second columns of the liquid, the columns having different heights. The liquid columns are connected at bottom portions thereof, and a level changing means provides a differential between the liquid levels of the two columns. The top portions of the two columns are similarly connected for returning unevaporated liquid from the second column to the first column. Liquid evaporated in the second column is condensed in a condensor to provide a distillate.

Preferably, a turbine or other mechanical component is included in the input column of liquid and is driven by the downward liquid flow, thereby to recover mechanical energy therefrom. Such a turbine may be used to drive an electrical generator.

In accordance with a preferred embodiment of the invention, there is provided an aeration tank for aerating the liquid in the second column thereby to cause at least partial evaporation thereof, and further to raise the liquid level of that column with respect to the first column to permit gravity-assisted return of unevaporated liquid to the first column. The aeration tank may be provided with a gas pumping structure driven by energy recovered from the first liquid column. The gas may be heated to enhance evaporation by use of waste heat generated by the gas pumping structure.

In accordance with one embodiment of the invention, the first and second columns may be formed by separate vertically oriented pipes which are connected at the bottom portions thereof. In accordance with a second embodiment, the first and second columns may be formed in a single tank structure, having a separator therein. The separator is arranged to permit communication between the liquid in the first and second columns, and may have a weir at its upper portion to permit flow of liquid from the second to the first column.

The inventive structure may further include a heater within the second column in order further to enhance evaporation of the liquid therein. The heater preferably may comprise a solar heater.

In accordance with another aspect of the inventive apparatus, there is provided a distilation apparatus for waste water, including a container for forming first and second water columns therein, arranged for supplying the waste water to the first column. A connection is provided between the lower portions of the columns, and an aerating means is provided for aerating the water in the second column and for raising its level relative to the water in the first column. A weir is included within the container for maintaining a water level difference between the columns and for permitting the unevaporated water from the second column to flow thereover into the first column. A condensing means receives water vapor from the second column for providing a condensate, and an energy recovery means is provided within the first column to recover energy from the water flowing downwardly therethrough.

The condensing means may include fin coils for passage of water vapor and condensate. The fin coils are arranged in a heat exchanging relationship for the vapor and condensate with a cooling fluid. The cooling fluid may include a portion of a gas provided to a pressurizing means for gas used to aerate the water in the second column.

The container may include a liquid level responsive control for controlling the supply of waste water to the first column in order to limit the water level therein. Additionally, the container may include a discharge for sediment and remanent solids.

Still other objects and features of the present invention will become more readily apparent to those skilled in the art from the following description wherein there is shown and described a preferred embodiment of the invention, simply by way of illustration of one of the best modes contemplated for carrying out the invention. As will be realized, the invention is capable of other, different, embodiments and its several details are capable of modifications in various obvious aspects, all without departing from the invention as recited in the appended claims. Accordingly, the drawings and descriptions should only be regarded as illustrative in nature and not as restrictive of the invention.

BRIEF DESCRIPTION OF THE DRAWINGS

The accompanying drawings, incorporated in and forming a part of the specification, illustrate several aspects of the present invention and, together with the description, serve to explain the principles of the invention. In the drawings.

DETAILED DESCRIPTION OF A PREFERRED EMBODIMENT

Figure 1:
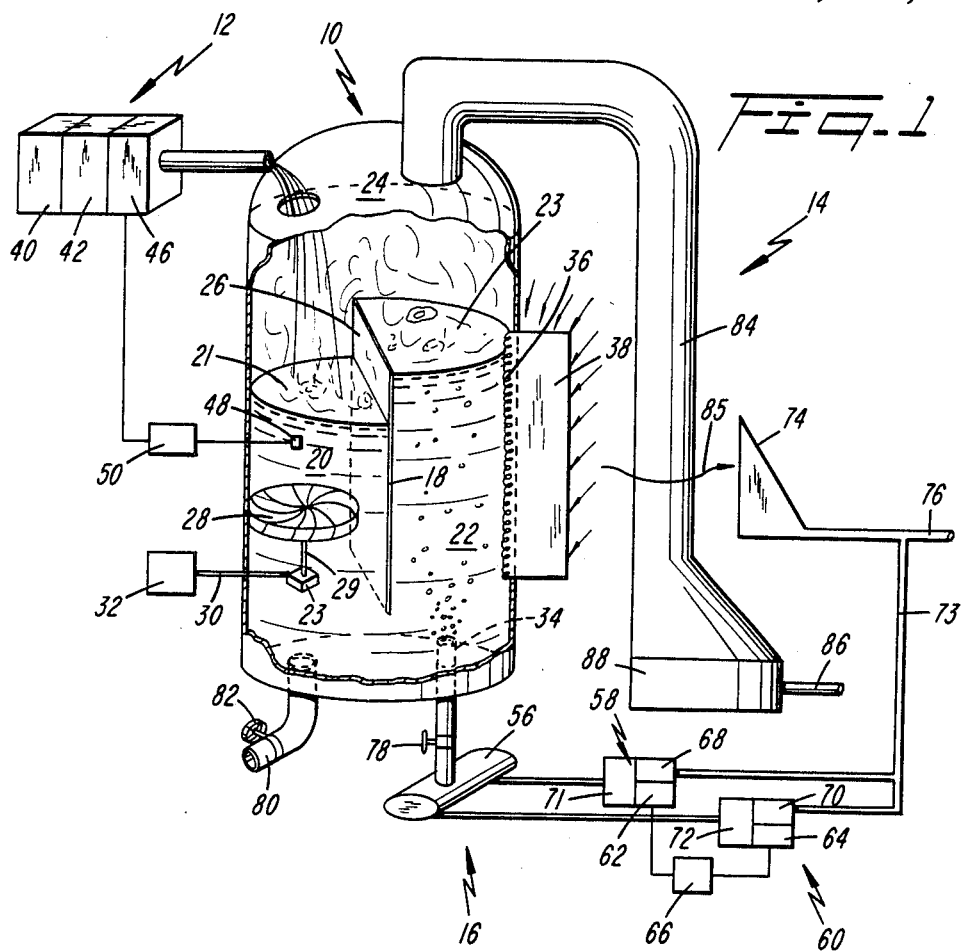
FIG. 1 provides a view of a preferred embodiment of the invention, partly schematically and partly in block diagram form.

Referring now to FIG. 1, the invention apparatus is shown as including a container 10 for liquid to be treated by the apparatus, the liquid being supplied by a source 12 therefor. External to the container 10 there is provided a condenser structure 14 and an aeration system 16. The purpose and functioning of other features shown in the drawing will become clear from the following description.

As is apparent from the illustration of container 10, a separator 18 is included therein to divide the container into two chambers, forming a pair of liquid columns 20 and 22 therein having different liquid levels, shown at 21 and 23, respectively. The separator provides for communication between the two liquid columns at their bottom portions, the container including an upper section 24 for communication of vapor and liquid atop the two columns.

Separator 18 further includes an upper portion 26, forming a weir for the liquid in column 22 and maintaining the different liquid levels of the two columns.

Vapor in the upper section 24 of the container is drawn off by condenser 14 for condensation, while unevaporated liquid from column 22 passes over the weir 26, drops to the level 21 of column 20, and is combined with the incoming liquid from source 12 for recirculation through columns 20 and 22.

It will thus be appreciated that liquid in column 20 is generally downwardly flowing. The downward flow is due, at least in part, to the downward flow of the incoming liquid from source 12 and of the recirculating liquid from column 22. The liquid in column 22, however, is typically upwardly flowing due, at least in part, to operation of the aeration system 16. Energy is extracted and recovered from the downward motion of the liquid in column 20 by a mechanical device, preferably in the form of a turbine 28 and shaft 29. Other flow-sensitive devices might be utilized to provide mechanical motion in accordance with the downward movement of the liquid in column 20. An output drive shaft 30, rotated by turbine 28, provides external mechanical motion for use with a utilization device. In the preferred embodiment, the recovered mechanical energy is used to drive an electrical generator 32. A mechanical coupling 33 may be used to connect the turbine shaft 29 to output drive shaft 30. The coupling may be in the form of a gear box, a universal joint, a flexible shaft or the like.

The portion of container 10 housing column 22 acts as an aeration tank for the liquid, primarily by provision of a source 34 for gas to bubble upwardly through the liquid.

As a result of the upwardly flowing gas within the liquid in column 22, there results an upward movement of the liquid as well as a reduction in the density of liquid in column 22 when compared with the density of the liquid in column 20. Moreover, the passage of gas through the liquid column results in increased evaporation at the top of column 22, thus increasing the vapor pressure in upper section 24 of container 10. As previously described, the vapor from the upper section 24 is passed through condenser 14 to provide a distilled form of the liquid within the container. The increased evaporation rate in upper section 24 thus increases the efficiency of the condensation and distillation of the liquid.

In order further to enhance evaporation and thereby to increase system efficiency, the gas provided by source 34 is preferably heated. Additionally, a separate heat source 36 may heat the liquid within column 22. As shown in FIG. 1, such a heat source may include a solar collector 38, thereby providing solar heating of the liquid in column 22. Heat source 36 may further include additional sources of heat, such as electrical or chemical heat sources.

From the foregoing, it should be appreciated that the present invention is applicable to distillation of any liquid. However, the invention is preferably used for distillation of water, specifically for distillation of waste water. Prior to supplying waste water to container 10, such water typically passes through conventional primary, secondary, and flow equalization units as shown at 40, 42 and 46. These units provide sedimentation, oxidation, filtration and clarification control for the incoming water, as well as regulation of flow rate.

It should be appreciated that the present invention relies on circulation of the water in columns 20 and 22 to drive turbine 28 and to recover energy from the mechanical flow of the incoming water. Accordingly, a sensor 48 may be provided to control flow of water into the container and to maintain the height of liquid column 20 at an appropriate level, below the top of weir 26, for example. The sensor generates a signal processed by a unit 50 which, in turn, may control the flow equalization unit 46. Sensor 48 may be a pressure sensor, a float, or other device useful in determining the height of column 20, and may provide mechanical or electrical indications to unit 50. The combination of unit 46, sensor 48 and unit 50 may be formed as a float operated valve.

However fabricated, this combination enables the water levels 21 and 23 of columns 20 and 22 to be maintained at an appropriate height differential by the aeration system 16. The height differential prevents incoming water from flowing to column 22 and from deteriorating operation of the inventive unit by increasing the density of the liquid in that column, since any increase in the density of the water in column 22 reduces the recirculation of water between the two columns which is used to rotate turbine 28.

By maintaining the separation of the liquid in the two columns, the water in column 20 is kept more dense than that in column 22, thus providing the different water levels for the two columns in spite of the common pressure provided by communication of the bottom portions of the two columns. A further factor in providing increased density in column 20 is the evaporation of liquid from column 22, resulting in an increased concentration of waste material in the water recirculated to column 20 over weir 26. There are thus several factors in the present invention which cooperate to cause circulation of water therein and rotation of turbine 28.

The aeration system used to raise the water level, and to enhance overall system efficiency, receives gas provided by source 34. Preferably, air is used, but any gas may be supplied by the aeration system. The air is provided to source pipe 34 from a tank 56. The aeration system 16 includes a pair of pressurizing devices 58 and 60 for maintaining the appropriate pressure in tank 56. Devices 58 and 60 include sources of mechanical power 62 and 64, controlled by a controller 66. The two devices operate at different output pressures. Device 58 includes a compressor 68, providing air at high pressure to the tank 56 for supply by source 34. Device 60 includes a blower 70, providing air at a lower pressure to tank 56 for reasons explained in the sequel.

Compressor 68 and blower 70 are operated by the mechanical power sources 62 and 64, which are preferably electrical motors. A pair of heat exchangers 71 and 72 may be provided for the air compressed by the two pressurizing devices 58 and 60, respectively. Thus, in addition to being heated by compression, the air is further heated by a heat-exchanging contact with the respective motors, blower and compressor. As previously mentioned, such use of waste heat enhances operation of the present apparatus by providing improved aeration of the liquid in column 22.

Air supplied to the pressurizing devices 58 and 60 is obtained through an inlet source 73. Preferably, the cooling air used to cool the condenser structure 14 is drawn into inlet 73 at a baffle 74. As hereinafter described, the air entering pressurizing devices 58 and 60 may itself be preheated by acting as the cooling fluid for condenser 14.

As previously mentioned, any gas may be used to aerate the water in column 22. Similarly, any fluid may be used to cool condenser 14. Where the fluid is a gas, and more particularly, where the fluid is the same gas used to aerate liquid column 22, use of the heated gas in the aeration process further enhances efficiency of operation of the present invention. Additional air, as required, is provided to the aeration system through air intake connection 76.

Aeration system 16 operates as an air-lift pump for the water in column 22. It is appreciated that other pumping devices may be used to pump the liquid in column 22 to a higher level than in column 21. The use of the air-lift pump provided by the present aeration system, however, results in more efficient operation by further enhancing the evaporation process as previously described and by providing warm, moist vapor for condensation in condenser 14.

In operation of the system, electric motor 62 is first energized to activate compressor 68 in pressurizing device 58 to provide rapid build-up of a relatively large volume of high-pressure air in tank 56. Once the pressure has built up within tank 56, motor 62 may be turned off to deactivate compressor 68, and motor 64 may be turned on to activate blower 70, operating at a lower pressure than compressor 68. The switch-over from operation of motor 62 to motor 64 may be automatically or manually achieved. Thus, controller 66 may include a timing device for energizing motor 62 for a predetermined time period, followed by deenergization of the motor and subsequent energization of motor 64. Alternatively, there may be provided a pressure detector within tank 56 to determine appropriate pressure build up, with a feedback connection to controller 66 for a pressure-controlled switching of operation between pressurizing devices 58 and 60.

Once the tank 56 becomes pressurized, a needle valve or other pressure regulating arrangement, shown at 78, may be operated to permit passage of pressurized air from tank 56 to water column 22. The valve 78 may be manually or automatically operated to permit appropriate air flow to source 34, thereby raising the water level within column 22 and initiating the circulation of water within the container, accordingly driving turbine 28. However, the circulation of the water may be similarly initiated by other pumping means. Thus, any device such as a turbine blade, a propeller-driven pump, or the like, may be used to provide the desired circulation and evaporation of the water.

Prior to shutting off the system, compressor 68 may be activated to build up a supply of high pressure air in tank 56. Thus, upon the next activation of the system, start-up delays may be minimized since the high pressure air would be immediately available.

Preferably, turbine 28, container 10 and liquid source 12 are so designed to generate sufficient electrical power to make the system substantially independent of external energy sources. Ideally, generator 32 provides more electrical power than required to operate motor 64. The excess energy may be stored to provide the increased power needed to operate motor 62, and any further excess may be provided for external use.

In order to provide a discharge for waste and sediment accumulated within container 10, there is provided an outlet 80. The outlet may be tapered or conically shaped and is preferably located in the vicinity of the bottom portions of column 20. A control valve 82 is provided for the outlet in order to permit selective discharge of the material from the container for periodic maintenance.

Condenser 14 may be comprised of a plurality of fin coils, symbolically shown at 84. The fin coils provide a heat-exchanging relationship between a mixture of vapor and condensate, collected at upper section 24 of container 10 and flowing within the coils, and the cooling fluid symbolized by arrow 85, flowing externally of the coils. The flowing mixture is repeatedly cooled until the vapor is preferably completely condensed, the resulting condensate being provided at an outlet 86 for use as required. Of course, the distillate may instead be temporarily stored in a storage container 88.

A structure in accordance with the present invention may function on any scale. For illustrative purposes only, however, in an example illustrative of operating dimensions for treatment of large quantities of waste water, the container 10 may be a substantially cylindrical tank approximately 20 high and 15 feet in diameter. This size provides sufficient capacity for treatment of large quantities of waste water, as well as a sufficient flow volume for providing significant output power from electrical generator 32. Alternatively, the dimensions may be changed with the volume of treated liquid remaining substantially the same. A tank 100 feet high may be used, with a reduced diameter. However, because of the substantially increased height, such a container would require a substantially widened support base, as available from a tank approximately 10 feet in diameter, for example.

Aeration in system 16 may include a 5 horsepower motor for power source 62, to drive a compressor providing approximately 100 p.s.i. output pressure. After overcoming initial friction, volume and pressure requirements, power source 64 may be energized to provide a lower, sustaining pressure 10 p.s.i., for example, within tank 56. Thus, power source 64 may be provided as a 3 horsepower motor. Although air tank 56 will be designed for the specific needs of a particular system, in conjunction with a 20 foot high 15 foot diameter container, a 3,600 gallon air tank may appropriate.

Generally speaking, use of a shorter but larger diameter container 10 leads to more efficient operation by requirement of smaller sized motors 62 and 64 and a smaller compressor 68 and a blower 70, since the shorter tank generates less head pressure and requires reduced air pressure for aeration. For example, with a head of 20 feet, 8 p.s.i. of air pressure would suffice, so that the pressurizing device 60 may utilize a 10 p.s.i. blower 70. However, at 100 feet of head, a pressure of 43 p.s.i. is required, so that a 50 p.s.i. compressor would be required even for sustaining operation. The use of smaller sized pressurizing devices advantageously enables the aeration system to be driven by electrical power generated by generator 32.

One mode of operation of the aeration system provides for activation of motor 62 to build up pressure within tank 56. Thereafter, when pressurizing device 60 starts to function, the needle valve and pressure regulator 78 may be opened so that the output of pressurizing device 60 is essentially provided through the valve 78 to source 34 at the bottom of container 10. Alternatively, the initial pressure may be raised to initiate operations, and lowered to the level provided by device 60 for operation. Thus, air tank 56 may be dispensed with, the outputs of devices 58 and 60 being combined in a mixing and regulating valve to provide both the initial and operating pressures.

Figure 2:
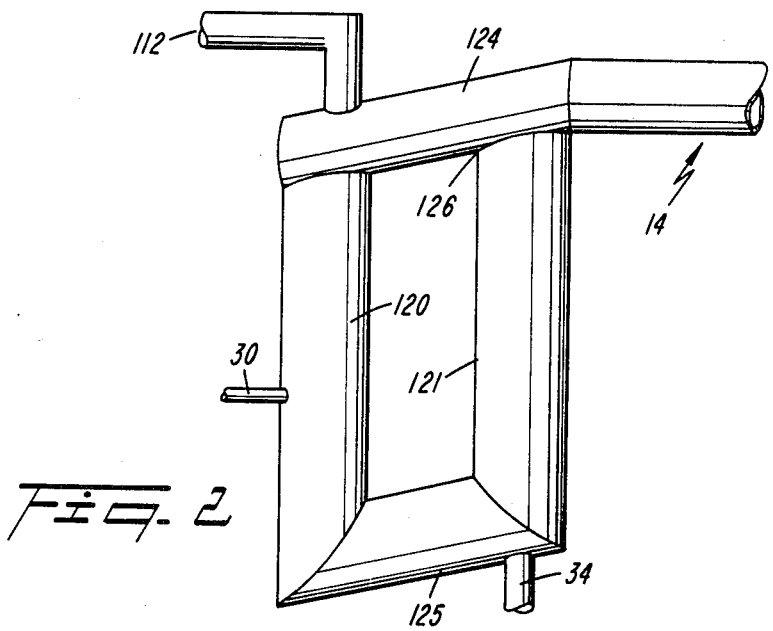
FIG. 2 shows a modification of a portion of the invention shown in FIG. 1.

The principle of the present invention does not require the use of a single container, but rather relies on the circulation of unevaporated liquid, in combination with newly injected liquid, through a dense column, a turbine, and then through lower density column provided with a higher liquid level. Accordingly, the container structure shown at 10 in FIG. 1 may be replaced by the embodiment shown at FIG. 2. Referring to FIG. 2, water columns 20 and 21 are seen to be formed by pipes 120 and 121, with the input waste water shown as entering an upper connecting member 124 from a source 112. A bottom connecting member 125 is provided for communication of the water at the bottoms of pipes 120 and 121.

Output drive shaft 30 is shown as protruding from pipe 120, while air source 34 is shown as connected to pipe 121 through the bottom connecting member 125. Finally, water vapor is withdrawn from the top of pipe 121, through upper connecting member 124 to the condenser 14.

It should be appreciated that operation of the structure shown in FIG. 2 is substantially the same as that shown in FIG. 1. However, a separator 18 is not provided inasmuch as the two water columns are separated by the two pipes within which they are folded. Further a weir is not provided in view of a slight downward inclination of upper connecting member 124 from pipe 121 to pipe 120. Thus, as the water level in pipe 121 rises above point 126, such water will flow downwardly into pipe 120 through the upper connecting member 124, and be mixed with the incoming liquid from source 112. A similar inclination may be provided to bottom member 125 to assure that the aerating gas does not enter pipe 120.

The embodiment shown in FIG. 2 illustrates only the changes provided from the structure of FIG. 1, rather than the components commonly provided therewith. Accordingly, the flow control mechanism, the turbine, the aeration system, the solar heater and the condenser of the inventive system are omitted from the illustration of FIG. 2.

The preceding specification thus describes a method and apparatus for purifying waste water, for desalinization of salt water, or for any application of a distillation process.

The described invention provides a substantially closed system, into which is supplied the liquid to be treated. The incoming liquid, with the various impurities therein, is dense and flows downwardly through one section of the structure both because of its injection at the top of the system and because of its heavy density. The downwardly flowing liquid causes a turbine or other device to rotate thereby providing output mechanical energy recovered from such downward flow. In a separate section of the structure, the liquid is aerated to provide warm, moist vapor for condensation, as well as to provide a higher water level for that section.

After removal of a fraction of the water in the second section of the inventive structure, the remaining or unevaporated water is more dense than the initially incoming water. This dense and unevaporated water flows downwardly from its higher level to the first section of the inventive structure, joining the incoming water and providing additional mechanical energy for rotation of the turbine or similar device.

The foregoing description of preferred embodiments of the invention has been presented for purposes of illustration and description, and is not intended to be exhaustive or to limit the invention to the precise forms disclosed, since many obvious modifications and variations are possible and will occur to those skilled in the art in light of the above teaching. The embodiments were chosen and described in order best to explain the principles of the invention and its practical application, thereby to enable others skilled in the art best to utilize the invention in various embodiments and with various modifications as are suited to the particular uses contemplated. It is intended that the scope of the invention be defined by the claims appended hereto, when interpreted in accordance with the full breadth to which they are fairly and legally entitled.

I claim:

1. Apparatus for distilling a liquid supplied thereto comprising:
    (a) fifst column forming means for forming a first column of the liquid having a first liquid level and receiving the supplied liquid therein,
    (b) a second column forming means for forming a second column of the liquid having a second liquid level,
    (c) level changing means for providing a differential between the liquid levels of said first and second columns and further for causing said second liquid level to be higher than said first liquid level, said level changing means comprising aerating means for supplying a gas to one of said first and second columns for aerating the liquid therein, (d) first connecting means for connecting bottom portions of said first and second columns, (e) condensing means for condensing liquid vapor generated in said second column and for providing a distillate thereof, (f) second connecting means for connecting top portions of said first and second columns and for returning unevaporated liquid from said second column to said first column, (g) said second column forming means including an aeration tank for aerating the liquid therein, (h) said aerating means of said level changing means comprising supply means for supplying the gas to said second column and for aerating the liquid therein, (i) pressurizing means for pressurizing the gas supplied by said supply means, (j) said pressurizing means comprising gas pumping means comprising compressor means and blower means for rapidly pressurizing gas in a storage tank and for maintaining pressure within said storage tank, respectively, and (k) each of said compressor means and said blower means comprising driving motor means and heat exchange means for heating the gas by waste heat of said driving motor means.

2. Apparatus as recited in claim 1 further comprising mechanical means arranged to be driven by downward flow of said liquid in one of said first and second columns for recovering mechanical energy therefrom.

3. Apparatus as recited in claim 2 further comprising electrical generating means operated by said mechanical means for providing electrical energy responsive to downward flow of supplied and returned unevaporated liquid in said first column.

4. Apparatus as recited in claim 1 further comprising first heating means for heating the gas supplied by said supply means.

5. Apparatus as recited in claim 1 further comprising second heating means for heating the liquid in said second column.

6. Apparatus as recited in claim 5 wherein said second heating means comprises a solar heater.

7. Appatatus as recited in claim 5 wherein said second heating means comprises electrical heating means.

8. Apparatus as recited in claim 1 wherein said pressurizing means comprises gas pumping means driven by energy recovered from the liquid flowing in said first column by a mechanical means arranged to be driven by downward flow of said liquid in said first column.

9. Apparatus as recited in claim 1 further comprising heating means for heating the gas supplied by said supply means, said heating means arranged for recovery of waste heat generated by said pressurizing means and for applying the recovered heat to the gas.

10. Apparatus as recited in claim 1 further comprising storage tank means for storing gas pressurized by said pressurizing means.

11. Apparatus as recited in claim 1 wherein said first and second column forming means comprise first and second pipes having first and second ends, said pipes oriented to provide vertical displacement between the respective first and second ends thereof, said pipes connected at the bottom portions thereof.

12. Apparatus as recited in claim 11 wherein said first pipe includes a turbine therein arranged to be driven by downwardly flowing liquid therein.

13. Apparatus as recited in claim 1 wherein said first and second columns are formed in a tank, the tank having a separator therein disposed to have a vertical displacement between two ends thereof, said separator forming said first and second columns in conjunction with surfaces of said tank, said separator arranged to permit communication of liquid between bottom portions of the columns formed thereby.

14. Apparatus as recited in claim 13 wherein said level changing means comprises a weir atop said separator.

15. Apparatus as recited in claim 13 wherein said aerting means is operable for supplying the gas to said second column and for aerating the liquid therein.

16. Apparatus as recited in claim 13 further comprising a mechanical means within said first column, driven by flow of said liquid in said first column, and an electrical generating means driven by said mechanical means.

17. Apparatus as recited in claim 13 further comprising a heating means within said second column formed in said tank for heating the liquid in said second column.

18. Apparatus as recited in claim 17 wherein said heating means comprises a solar heater.

19. A method for distilling a liquid comprising the steps of:

(a) supplying the liquid to a first conduit having a vertica. displacement between its two ends;

(b) providing the liquid from the lower one of the two ends of said conduit to a lower one of two ends in a second conduit having a vertical displacement between its two ends;

(c) causing the liquid in said second conduit to rise to a level higher than the liquid in said first conduit by aerating the liquid in said second conduit with a pressurized gas;

heating the gas with waste heat of a motor used for pressurizing the gas;

(d) evaporating and condensing a portion of the liquid in said second conduit to obtain a distillate thereof, and (e) returning unevaporated liquid from the high level of said second conduit to said first conduit.

20. A method as recited in claim 19 further comprising the step of using downward flow of the liquid in said first conduit for driving a mechanical apparatus to provide a mechanical output whereby energy is recovered from the downward flow for other uses.

21. A method as recited in claim 20 further comprising the step of driving an electrical generator with the output of said mechanical apparatus.

22. A method as recited in claim 20 further comprising the step of utilizing the energy output by said mechanical apparatus to drive a pressurizing apparatus for pressurizing the gas.

23. A method as recited in claim 22 further comprising the step of heating the gas utilizing heat generated by said pressurizing apparatus.

24. A method as recited in claim 22 further comprising the steps of:

(a) using a condenser in said evaporating and condensing step, (b) providing a gas for cooling the liquid vapor in said condenser, and p1 (c) providing at least a portion of the gas used in cooling the condenser to the pressurizing apparatus.

25. Apparatus for distilling waste water supplied thereto comprising:
(a) container means for forming first and second columns of water therein;
(b) said container arranged for supplying said waste water to said first column;
(c) said first and second columns arranged with a connection between lower portions thereof;
(d) means for aerating the water in said second column for raising the level thereof relative to said first column;
(e) condensing means for receiving water vapor from said second column and for providing a condensate;
(f) weir means within said container disposed for maintaining a difference in water level between said first and second columns and for permitting unevaporated water from said second column to flow thereover into said first column;
(g) means for recovering energy from downwardly flowing water in said first column and for outputting the recovered energy;
(h) said aerating means comprising supply means for supplying a gas to said second column and for aerating the liquid therein,
(i) pressurizing means for pressurizing the gas supplied by said supply means,
(j) said pressurizing means comprising gas pumping means comprising compressor means and blower means for rapidly pressuring gas in a storage tank and for maintaining pressure within said storage tank, respectively, and
(k) each of said compressor means and said blower means comprising driving motor means and heat exchange means for heating the gas by waste heat of said driving motor means.

26. The apparatus recited in claim 25 further comprising waste water supply means for supplying said waste water to said first column and liquid level responsive control means in said first column for controlling said waste water supply means.

27. Apparatus as recited in claim 25 further comprising discharge means in said container for discharging sediment and remanent solids therefrom.

28. Apparatus as recited in claim 25 wherein said means for recovering energy comprises turbine driven electric generator means for providing electrical energy.

29. Apparatus as recited in claim 28 wherein said pressurizating means for pressurizing a gas includes conduit means for supplying the pressurized gas to a lower portion of said second column, said means for pressurizing connected to be driven by electrical energy provided by said electric generator means.

30. Apparatus as recited in claim 25 wherein said condensing means comprises fin coils for passage of water vapor and condensate therethrough, said fin coils arranged in heat exchanging relationship to be cooled by a fluid.

31. Apparatus as recited in claim 30 wherein said pressurizing means for pressurizing a gas includes conduit means for supplying the pressurized gas to a lower portion of said column, and
wherein the fluid cooling said fin coils comprises at least a portion of the gas provided to said pressurizing means.

32. Apparatus as recited in claim 1 further comprising controller means for alternately activating said compressor means and said blower means.

33. Apparatus for gravity assisted distillation of a liquid comprising:
recirculating means for recirculating a liquid in two columns to provide generally downwardly flowing liquid in one column and generally upwardly flowing liquid in a second column;
said recirculating means comprising aerating means for changing liquid density in said second column to raise liquid level thereof, for enhancing evaporation of the liquid in said second column, and for providing said generally upward flow therein;
first connecting means for transferring liquid above a predetermined level in said second column to said one column for combining with externally supplied liquid at an upper portion thereof and for providing said generally downwardly flow therein;
second connecting means for transferring liquid from a bottom portion of said one column to a bottom portion of said second column;
separate condensing means, connected for withdrawing vapor from an upper portion of said second column for condensing said withdrawn vapor;
said aerating means of said recirculating means comprising supply means for supplying a gas to said second column and for aerating the liquid therein,
pressurizing means for pressurizing the gas supplied by said supply means,
said pressurizing means comprising gas pumping means comprising compressor means and blower means for rapidly pressurizing gas in a storage tank and for maintaining pressure within said storage tank, respectively, and
each of said compressor means and said blower means comprising driving motor means and heat exchange means for heating the gas by waste heat of said driving motor means.

34. Apparatus as recited in claim 33 further comprising mechanical power withdrawing means driven by said downwardly flow of said liquid in said one column.

35. Apparatus as recited in claim 33 further comprising weir means for maintaining separate levels and separate densities of the liquid in said one and in said second column and for maintaining a common hydrostatic pressure at the bottom of said one and said second columns.

36. Apparatus as recited in claim 6 wherein said second heating means further comprises electrical heating means.

* * * * *